United States Patent [19]

Berry

[11] Patent Number: 4,671,977
[45] Date of Patent: Jun. 9, 1987

[54] METHOD OF AND TEMPLATE FOR JOINING ABUTTING EDGES OF CARPETS

[76] Inventor: Don H. Berry, P.O. Box 20, Carmichael, Calif. 95608

[21] Appl. No.: 707,544

[22] Filed: Mar. 4, 1985

Related U.S. Application Data

[63] Continuation of Ser. No. 319,275, Nov. 9, 1981, abandoned.

[51] Int. Cl.[4] ................................................. B32B 3/00
[52] U.S. Cl. .................................... 428/62; 156/304.4; 428/82; 428/88; 428/192; 428/193
[58] Field of Search .................... 428/62, 82, 88, 192, 428/193; 156/304.4

[56] References Cited

U.S. PATENT DOCUMENTS

| | | |
|---|---|---|
| 766,930 | 8/1904 | Clemons . |
| 1,303,687 | 5/1919 | Leffler . |
| 2,027,747 | 1/1936 | Mortion ................................ 229/48 |
| 2,101,359 | 12/1937 | Bonner ................................. 428/88 |
| 2,391,731 | 12/1945 | Miller et al. .......................... 51/188 |
| 2,974,566 | 3/1961 | Hurley ................................... 88/289 |
| 3,120,083 | 2/1964 | Dahlberg ............................... 428/82 |
| 3,400,245 | 9/1968 | Burgess ............................... 219/245 |
| 3,523,176 | 8/1970 | Hill ...................................... 219/245 |
| 3,582,436 | 6/1971 | Bucher ................................ 156/502 |
| 3,927,298 | 12/1975 | Prater ................................. 219/245 |
| 3,969,564 | 7/1976 | Carder ................................. 428/62 |
| 3,985,169 | 10/1976 | Chow .................................. 144/317 |
| 4,130,150 | 12/1978 | Cook et al. ............................ 144/2 |

Primary Examiner—Marion C. McCamish
Attorney, Agent, or Firm—Flehr, Hohbach, Test, Albritton & Herbert

[57] ABSTRACT

A new method of joining the edges of two sections of carpeting involves forming complementary curved surfaces on the opposed edges to be joined by means of a novel template, and securing the complementary surfaces in edge-to-edge engagement by sewing or adhesively joining the sections to form a seam that is substantially hidden by the pile of the carpet. Also, the seam of the present invention provides a new unified section of carpeting.

25 Claims, 6 Drawing Figures

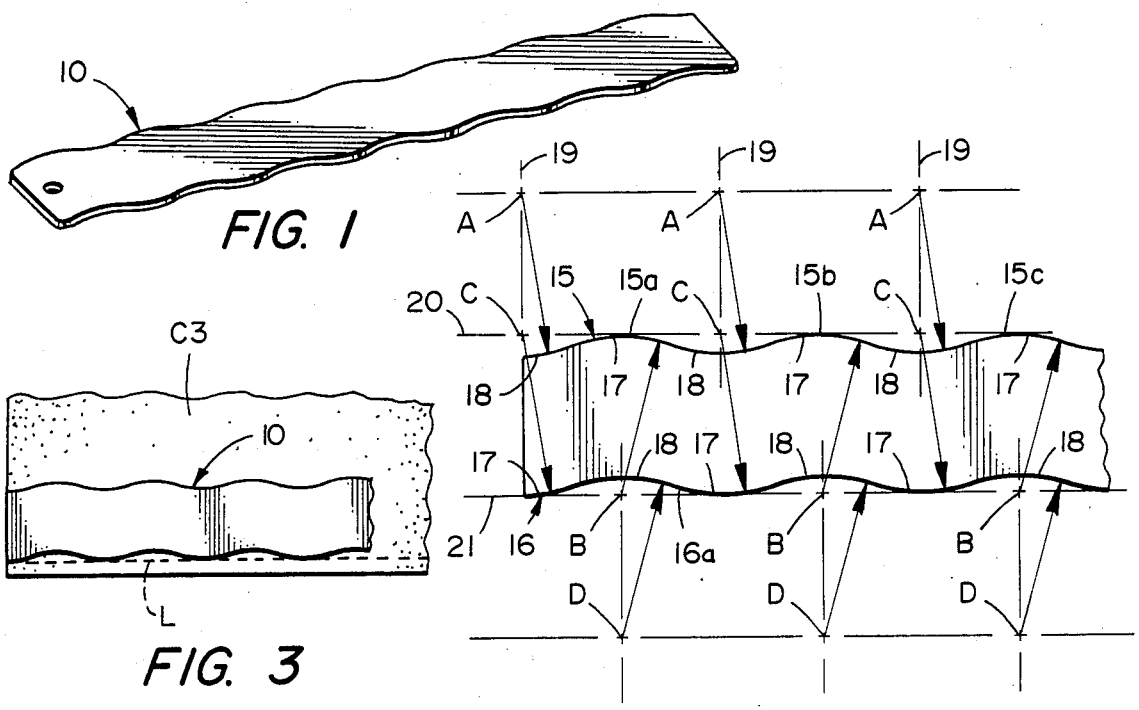
FIG. 1
FIG. 2
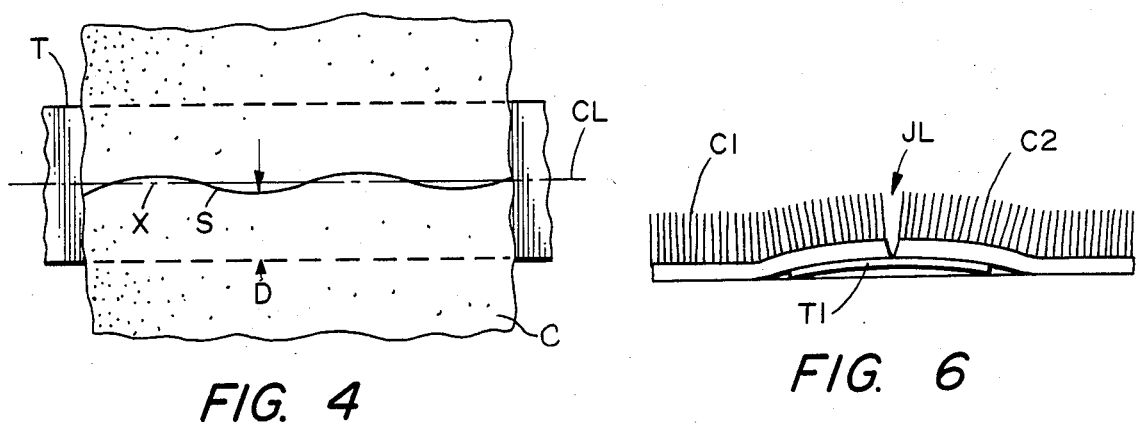
FIG. 3
FIG. 4
FIG. 6
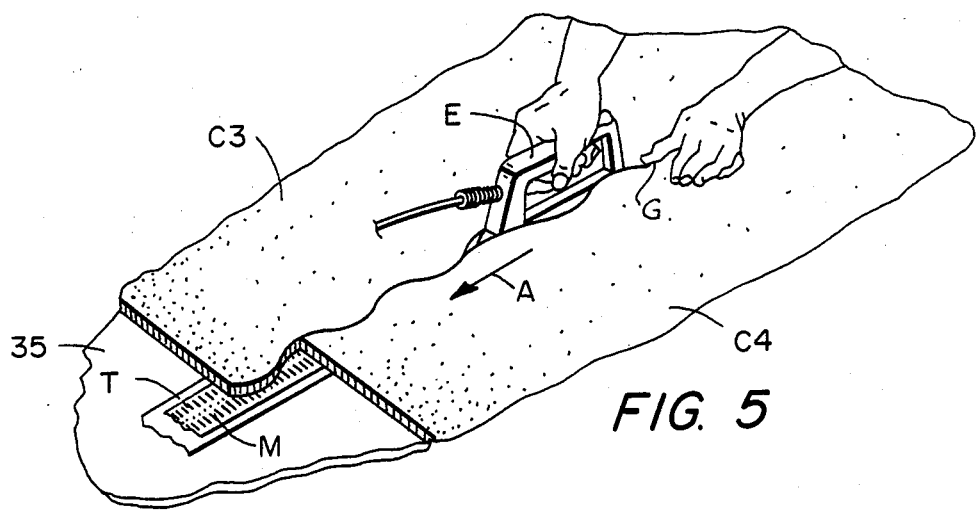
FIG. 5

METHOD OF AND TEMPLATE FOR JOINING ABUTTING EDGES OF CARPETS

This is a continuation of application Ser. No. 319,275 filed Nov., 9, 1981, now abandoned.

BACKGROUND OF THE INVENTION

In the past, adjacent sections of carpeting have been joined by sewing them together. In recent years it has been found to be more efficient to make a permanent seam between abutting edges of carpeting by means of a suitable tape which is coated with adhesive, referred to as hot-melt adhesive, that is capable of being converted to the molten state by an electrically-heated iron. In one method of forming the seam, known as face-seaming, the edges to be joined are brought into abutting engagement above a seaming tape that has an upwardly facing ribbon of adhesive provided thereon. The heated sole plate of an electrically-heated iron is inserted between the tape and the carpet edges with the sole plate in engagement with the tape. The iron is then moved along the tape at such a speed that the adhesive behind the trailing edge of the iron is in a molten condition ready to receive and adhesively join the lower surfaces of the carpet with the edges in abutting relation. Apparatus for carrying out the above method is disclosed in each of the patents to Hill, U.S. Pat. No. 3,523,176, Bucher, U.S. Pat. No. 3,582,436, and Prater, U.S. Pat. No. 3,927,298.

The present invention relates to the art of seaming of carpets and to apparatus for carrying out such procedures. More particularly it concerns a template which may be used in carpet seaming to give the abutting edges of the carpet complementary configurations such that, when the seam has been completed, the pile of the carpet will substantially hide the line of juncture.

Traditionally, in seaming of two pieces of carpet, the opposed edges that are to be brought into abutting contact are cut along straight lines so that the juncture line between the carpet sections will be a straight line. Such a procedure has, of course, been generally successful. However, under certain conditions, the straight seam can be detected by one looking down on the carpet. Also, it has been found that, when a carpet section having sections joined by a straight seam is stretched, the seam raises upward slightly in an action known as peaking. This action is illustrated in FIG. 6 where carpet sections $C_1$ and $C_2$ are secured to a seaming tape $T_1$ along a straight-line juncture line JL. Such a raised seam is visually detectable under some conditions and, during normal use, the seam areas become worn quicker than the adjacent areas of the carpet. It is an object of the invention to provide a method of seaming carpeting which results in a seam that will not "peak" during installation and is substantially hidden by the pile of carpet.

In one embodiment of the invention, a novel template is used in the cutting of curved lines on the surfaces of two carpet sections near the edges of the sections to provide the carpet sections with scalloped edges having curved or serpentine configurations. The configuration of one edge is complementary to that of the other edge so that the crests of one scalloped edge can interlace in the troughs of the other edge and thus permit the edges to be brought against each other in close abutting relation. Accordingly, the juncture line formed by the edges is not a straight line but extends along a winding path that is arcuate or serpentine in configuration. It has been found that, when carpet edges are prepared and cut in the above manner the juncture line of the seam criss-crosses the longitudinal centerline of the seaming tape, providing strength instead of the usual weakness of a straight seam, and eliminates the peaking resulting from a straight seam hinging upwardly. Sections of other articles such as belts, have been joined by the abutment of edges which are not straight so that the joinder line is not straight. However, in each case, the purpose of the particular non-straight configuration of the seam line has been to provide strength, or some other physical characteristic. It has never been to hide the seam and, accordingly, the seams are visible. Some patents that disclose various articles having seamed joints are the patents to Clemons, U.S. Pat. No. 766,930, to Miller at al., U.S. Pat. No. 2,391,731, to Leffler, U.S. Pat. No. 1,303,687. None of these patents concern carpets, the joining of carpet seams, or the problem of peaking encountered during carpet installation.

SUMMARY OF THE INVENTION

A seaming method of joining edges of two carpet sections includes the steps of cutting complementary surfaces, that are not straight, on the opposed edges of the two carpet sections, bringing the complementary edge of one section into abutting contact with the complementary edge of the other section, and joining the sections by securing the undersides of the sections near their edges to a tape or by sewing the edges together. The invention also includes a unique template for carrying out the novel carpet seaming method, and the carpet formed by the method.

DESCRIPTION OF THE DRAWINGS

FIG. 1 is an isometric of a template constructed in accordance with the present invention.

FIG. 2 is an enlarged plan of a portion of the template of FIG. 1.

FIG. 3 is a diagrammatic plan illustrating one method of positioning the template relative to the edges of a carpet section that is to be cut.

FIG. 4 is an enlarged diagrammatic showing of a portion of two carpet sections positioned over a tape.

FIG. 5 is a fragmentary perspective of an operator joining the edges of two carpet sections prepared in accordance with the present invention.

FIG. 6 is a diagrammatic section illustrating an action that can occur in prior art seaming procedures.

DESCRIPTION OF A PREFERRED EMBODIMENT

In FIGS. 1 and 2, the reference numeral 10 indicates a template constructed in accordance with the present invention. The template is an elongate flat member made of steel plate that is about $\frac{1}{8}''$ thick. The template may come in several lengths such as 35" and 70" and, in each case, it is about $\frac{1}{8}''$ thick. As seen in FIG. 2, the template has opposite side edges 15 and 16, each edge having a curved configuration made up of crests 17 and troughs 18 that repeat in a regular pattern so that the pattern may be considered to be divided into a plurality of side-by-side sections. Each section of the pattern is defined between parallel centerlines 19 that are 5" apart and a pair of parallel boundary lines 20 and 21 that are perpendicular to the lines 19 and are spaced 4" apart.

Side edge 15 is made up of a plurality of segments 15a, 15b, 15c, etc., each segment extending between two of the centerlines 19. The edge of segment 15a is defined by portions of arcs of circles. Each of the arcs that determine the troughs 18 of edge 15 is part of a circle of 4' radius forme about a point A that is located on one of the centerlines 19, 3⅝" from boundary line 20. The arcs that determine the crests 17 of edge 15 are parts of circles of 4" radius formed about points B that are on the boundary line 21 midway between adjacent centerlines 19.

Side edge 16 is made of a plurality of segments 16a, 16b, 16c, etc., each segment extending between two adjacent centerlines 19. The edge of segment 16a is formed by arcs of circles, each of the arcs that determine the crests 17 of edge 16 being part of a circle of 4" radius formed about a point C that is located on one of the centerlines 19 and on the boundary line 20. The arcs that determine the troughs 18 of edge 16 are parts of circles of 4" radius formed about points D that are located 3⅝" from boundary line 21 midway between the centerlines 19.

The template 10 is put into operation in the following manner. Whenever it has been determined that the piece of carpet, which has been allocated for covering a particular space, is not large enough to completely cover that space, the piece of carpeting is turned over and, with the back surface of the carpet facing upwardly, a cut is made along the edge using template 10. In FIG. 3, the piece of carpeting to be trimmed is indicated by the reference letter C3. If the carpeting is from a new roll, its edge may be irregular. Accordingly, a straight chalk line L is drawn on the carpet backing usually parallel to the edge to be prepared. The template is then laid on the carpet with the crests of one edge of the template aligned with the chalk line L. The template rests throughout its length in face-to-face contact with the back side of the carpet so that it provides a solid guide for a cutting tool, such as a typical carpet knife, that is drawn along the curved edge of the template to cut through the backing of the carpeting.

Edges can be made on both of the carpet sections with one positioning of the template if the carpet sections are brought into side-by-side relation and the template is positioned so that it straddles the small gap between the sections adjacent the edges that are to be cut.

When the edges of two pieces C3 and C4 (FIG. 5) of carpeting have been provided with the serpentine edges, the carpet pieces are turned over and placed on an underlying flat support surface 35 with the serpentine edges in abutting contact with the troughs on the edge of one piece of carpet receiving crests on the edge of the other piece, and with both edges overlying a tape T which carries hot melt M on its upper surface. The edges of the carpet are than lifted slightly and an electric iron E is inserted between the edges and the tape, with the sole plate of the iron resting on the hot melt. The iron E is then moved forwardly in the direction of arrow A at an approximate speed of 3 feet per minute. As the heated sole plate moves along the tape, the hot melt becomes molten and, as soon as the plate passes out of contact with the hot melt, the operator who is advancing the electric iron with one hand, presses the edges of the carpet on the trailing side of the iron at G down into the hot melt adhesive. After the edges have been moved into contact with the hot melt, a seam roller is run over the seam to press the portions of the carpet overlying the hot melt down into firm engagement with the hot melt. An elongate weighted bar can then be slid over the seam to maintain a downward pressure while the adhesive is cooling.

When the carpet edges are given a serpentine configuration and the carpet pieces are joined according to the above procedure, the colors and patterns of the carpet pile are so blended and the fibers of the pile are so interlaced that the seam is very difficult to detect by eye. Further, the seam between the two sections is particularly strong so that the seam will not peak when a stretching force is applied to the carpeting during subsequent steps in the installation process.

It is to be noted in FIG. 4 that, if the seam S is perfectly centered over the tape T with the centerline CL of the tape directly under an imaginary line "X" that extends longitudinally through the center of the scalloped edges of the carpet sections, the fact that the edge has a serpentine configuration reduces the area at which each carpet section can engage the tape on each side of the tape centerline. Thus, at each trough in the edge, the depth D of possible engagement between the carpet section C and the tape is reduced by an amount equal to half the depth of the trough. If the adhesive does not spread to the edge of the tape, the depth of possible engagement is further decreased. Also, if the seam is not accurately centered over the tape, the area of possible engagement could be further reduced. In the preferred embodiment, the depth of the trough on each side of the imaginary longitudinal centerline "X" of the scalloped edge of the carpet sections is 3/16". If the troughs are made deeper, the possibility of inadequate gripping of the carpet with the tape is increased. On the other hand, if the depth of the troughs is decreased, the edge begins to approach a straight-line configuration which is undesirable, due to the possibility of peaking. In the preferred embodiment, the troughs are ⅜" deep, i.e., 3/16" on each side of the imaginary longitudinal centerline "X". This depth of trough has been proven to result in a serpentine seam that is strong enough to resist the tensions exerted on it during the stretching of the carpet as it is installed, and one that does not cause peaking during stretching. However, it is recognized that the curvature of the scalloped edges and the depth of the troughs can be varied somewhat and still obtain a strong, nonpeaking seam and it is within the teaching of the present invention to provide seams which have other non-straight-line configurations, such as a zig-zag pattern, that will prevent peaking and will provide adequate seam strength.

Again it is to be noted in FIG. 4, that the crests of the serpentine edge of each carpet section criss-cross past the centerline CL of the tape therebelow. Since, during peaking of straight line seams, the tape bends or hinges along a straight line directly under the straight seam, the fact that the crests of the carpet sections of the present invention criss-cross over the centerline of the tape, prevents the formation of a hinge line at the seam.

In the preferred method of carrying out the present method of joining carpet sections, the cutting tool is pressed against the curved edge of the template as it cuts through the backing of the carpet. It is also within the scope of the present invention to use the template to initially make a serpentine line on the carpet backing with chalk or the like, and then put the template aside and make a cut along the line. Regardless of which method of making the cut is used, the cut is preferably made on the back-side of the carpeting. However, in joining two sections of carpeting that has a front surface adapted for cutting, such as a carpet having a dense, low-pile surface, the cutting and/or marking can be made on the front face of the carpet in accordance with the present invention.

While reference is made herein to the word carpeting, it is to be understood that the principle hereof is equally applicable to other forms of floor covering.

I claim:

1. A carpet comprising a first carpet section having an edge of serpentine configuration, said edge including a backing and a front face which are part of said first carpet sections, a second carpet section having a second edge of serpentine configuration, said second edge including a backing and a front face which are part of said second carpet section, and means for securing said sections together with the serpentine edges in interlaced abutting relation, said serpentine edges extending substantially throughout the height of the serpentine interlaced abutting edges, said means for securing said sections together including an elongated tape positioned under said carpet sections with the serpentine edge of each section criss-crossing the longitudinal centerline of the tape.

2. A floor-covering comprising a pair of sections having complementary edges of zig-zag configuration disposed in abutting edge-to-edge relation, each of said edges including a backing, a back face and a front face which are part of their associated section, an elongate tape disposed in contact with the back face of said sections adjacent the juncture line of said sections, and means for securing the sections to said tape with the crests of each zig-zag edge being disposed in a valley between two adjacent crests on the other edge.

3. A floor covering according to claim 2 wherein said pair of sections are stretched into a floor covering position whereby, because of the zig-zag configuration of said complementary edges, said edges do not peak upward to the extent that they would if the edges where straight.

4. A floor-covering comprising two sections having complementary scalloped edges, each of said edges including a backing, a back face and a front face which are part of their associated section, and means for securing said sections together with the crests of each scalloped edge being nested between the crests of other scalloped edge, said securing means including an elongate seaming tape disposed in flat engagement with the back faces of said sections adjacent the juncture of said sections with the crests of each scalloped edge being disposed on one side of the longitudinal centerline of the tape and the valleys of the edge being disposed on the opposite side of the centerline, and an adhesive securing said tape to said carpet sections.

5. An installed carpet which is installed over a flooring in a stretched condition, said installed carpet comprising first and second carpet sections, each of which has an edge throughout its thickness of serpentine configuration, said edges being complementary in configuration to each other, and means for securing said sections together with the serpentine edges in interlaced abutting relation whereby, because of the serpentine configuration of said abutting edges, said edges do not peak upward to the extent they would if the edges were straight while in said stretched condition.

6. An installed carpet according to claim 5 wherein said means for securing said sections together includes an elongated tape positioned under said carpet sections with the serpentine edge of each section criss-crossing the longitudinal centerline of the tape.

7. An installed carpet which is installed over a flooring in a stretched condition, said installed carpet comprising first and second carpet sections, each of which has an edge throughout its thickness of arcuate confirguration, said edges being complementary in configuration to each other, and means for securing said sections together with the serpentine edges in interlaced abutting relation whereby, because of the arcuate configuration of said abutting edges, said edges do not peak upward to the extent they would if the edges were straight while in said stretched condition, 8. An installed carpet which is installed over a flooring in a stretched condition, said installed carpet comprising first and second carpet sections, each of which has an edge throughout its thickness of zig-zag configuration, said edges being complementary in configuration to each other, and means for securing said sections together with the serpentine edges in interlaced abutting relation whereby, because of the zig-zag configuration of said abutting edges, said edges do not peak upward to the extent they would if the edges were straight while in said stretched condition.

9. An installed carpet which is installed over a flooring in a stretched condition, said installed carpet comprising first and second carpet sections, each of which has an edge throughout its thickness of scalloped configuration, said edges being complementary in configuration to each other, and means for securing said sections together with the serpentine edges in interlaced abutting relations whereby, because of the scalloped configuration of said abutting edges, said edges do not peak upward to the extent they would if the edges were straight while in said stretched condition.

10. A floor covering in position over a floor comprising a pair of sections having complementary edges of non-linear configuration disposed in abutting edge to edge relation, each of said edges including a backing, a back face and a front face which are part of their associated sections, an elongate tape disposed in contact with the back faces of said sections directly under and overlapping the juncture line of said sections for securing said sections together, said sections being stretched over said floor and said abutting edges forming said juncture being configured such that said edges do not peak upward to the extent they would as a result of said stretching if the edges where straight.

11. A template for aiding in the formation of adjoining seam edges of two sections of carpet to be joined together, said template comprising a rigid main body which is substantially longer than it is wide and which includes opposite first and second lengthwise edges, each extending along substantially the entire length of said body and serving to guide a carpet cutting tool along its length as the tool is caused to cut through said carpet to form said edges, said first lengthwise edge being serpentine in configuration so a to define a plurality of successive, alternating and identical curved crests and troughs and said second lengthwise edge being identical in configuration but staggered relative to said first edge such that the crests of said second edge are positioned directly opposite the troughs of the first edge and the troughs of said second edge are positioned directly opposite the crests of said first edge.

12. A template for aiding in the formation of adjoining seam edges of two sections of carpet to be joined together, said template comprising a rigid main body which is substantially longer than it is wide and which includes opposite first and second lengthwise edges, each extending along substantially the entire length of said body and serving to guide a carpet cutting tool along its length as the tool is caused to cut through said carpet to form said edges, said first lengthwise edge being configured so as to define a plurality of successive, alternating inwardly and outwardly curved sections and said second lengthwise edge being identical in configuration but staggered relative to said first edge such that the outwardly curved sections of said second edges are positioned directly opposite the inwardly curved sections of the first edge and the inwardly curved sections of said second edge are positioned directly opposite outwardly curved sections of said first edge.

13. A method of joining two sections of carpeting, each of said sections including a backing and a front face, said method comprising the steps of cutting through the backing and front face of each section to form on each section a serpentine edge that is complementary to the edge on the other sections, and securing the sections together with said edges in interlaced abutting relation by adhesively bonding both sections to a seaming tape in the area where the carpet edges abut, said serpentine edges extending substantially throughout the height of the respective interlaced abutting edges.

14. A method of joining two sections of carpeting, each of said sections including a backing and a front face, said method comprising the steps of cutting through the backing and front face of each section to form on each section a serpentine edge that is complementary to the edge on the other sections, and securing the sections together with said edges in interlaced abutting relation by sewing the carpet sections together at the area where the carpet edges abut, said serpentine edges extending substantially throughout the height of the respective interlaced abutting edges.

15. A method of installing floor carpeting requiring at least two sections of said carpeting, each of said sections including a backing and a front face, said method comprising the steps of providing said two sections and cutting through the backing and the front face of each one thereof to form on each section an arcuate edge that is complementary to the edge on the other section, securing the carpet sections together with said edges n abutting engagement, said arcuate abutting edges extending substantially throughout the height of the respective abutting edges, and thereafter stretching said carpeting into a final position over a floor whereby, because of the arcuate configuration of said abutting edges, said edges do not peak upward to the extent they would if the edges were straight.

16. A method according to claim 15 wherein each of said arcuate edges is serpentine in configuration.

17. The method of claim 16 wherein said securing step is accomplished by adhesively bonding both sections to a seaming tape in the area where the carpet edges abut.

18. The method of claim 16 wherein said securing step includes sewing the carpet sections together at the area where the carpet edges abut.

19. A method of installing floor carpeting requiring at least two sections of said carpeting, each of said sections including a backing and a front face, said method comprising the steps of providing said two sections and cutting through the backing and the front face of each one thereof to form on each section a non-linear edge that is complementary to the edge on the other section, securing the carpet sections together with said edges in abutting engagement, said non-linear abutting edges extending substantially throughout the height of the respective abutting edge, and thereafter stretching said carpeting in a final position over a floor whereby, because of the non-linear configuration of said abutting edges, said edges do not peak upward to the extent they would if the edges were straight.

20. A method according to claim 19 wherein said abutting edges are zig-zag in configuration.

21. A method according to claim 19 wherein said abutting edges are scalloped in configuration.

22. In a method of installing floor carpeting requiring at least two sections thereof to cover a floor area, said method including the steps of providing said two sections of carpeting, each of which includes an edge throughout its thickness which is complementary to an edge of the other section, positioning said carpet sections adjacent one another with their complementary edges in abutting relationship, fixedly securing said complementary edges in said abutting relationship, and thereafter stretching said carpet into a final position, the improvement comprising the step of providing said carpet sections such that the complementary edges are of a non-linear configuration, whereby to minimize peaking at said edges when the carpet is stretched.

23. The improvement according to claim 22 wherein said non-linear configuration is serpentine in configuration.

24. The improvement according to claim 22 wherein said non-linear configuration is zig-zag in configuration.

25. The improvement according to claim 22 wherein said non-linear configuration is scalloped in configuration.

* * * * *